United States Patent [19]
Anderson et al.

[11] Patent Number: 5,615,593
[45] Date of Patent: Apr. 1, 1997

[54] METHOD AND APPARATUS FOR CONTROLLABLY POSITIONING A HYDRAULIC ACTUATOR

[75] Inventors: Glenn A. Anderson, St. Charles County, Mo.; James D. Linerode, Will County, Ill.

[73] Assignee: McDonnell Douglas Corporation, St. Louis, Mo.

[21] Appl. No.: 447,406

[22] Filed: May 23, 1995

Related U.S. Application Data

[63] Continuation-in-part of Ser. No. 179,952, Jan. 11, 1994, abandoned.

[51] Int. Cl.$^6$ ............................................. F15B 15/22
[52] U.S. Cl. ............................ 91/24; 91/27; 91/363 R; 91/509; 91/519
[58] Field of Search .......................... 91/20, 24, 27, 91/363 R, 363 A, 509, 519

[56] References Cited

U.S. PATENT DOCUMENTS

| | | |
|---|---|---|
| 3,038,449 | 6/1962 | Murphy, Jr. et al. . |
| 3,183,785 | 5/1965 | Bidlack ............................... 91/27 |
| 3,279,323 | 10/1966 | Asche . |
| 3,338,139 | 8/1967 | Wood . |
| 4,089,494 | 5/1978 | Anderson et al. ................. 91/363 R |
| 4,436,018 | 3/1984 | Murphy et al. . |
| 4,555,974 | 12/1985 | Mason et al. . |
| 4,825,748 | 5/1989 | Sheng . |

FOREIGN PATENT DOCUMENTS

| | | | |
|---|---|---|---|
| 70957 | 9/1983 | European Pat. Off. ............. | 91/20 |

*Primary Examiner*—F. Daniel Lopez
*Attorney, Agent, or Firm*—Bell, Seltzer, Park & Gibson, P.A.

[57] ABSTRACT

A system and method for controllably positioning a hydraulic actuator which is operably connected to a control surface includes at least one main control valve for controlling the hydraulic pressure supplied to the actuator in response to a control signal indicative of a predetermined actuator position and at least one parallel control valve for supplying additional hydraulic pressure to the actuator in response to an error signal indicative of the difference between the position of the actuator and the predetermined actuator position to thereby correct for any differences indicated by the error signal. By correcting for any differences indicated by the error signal, the errors in positioning the control surface can be decreased and the stiffness of the control surface can be increased. The control system also includes a sensor for monitoring the position of the actuator and a controller for generating the error signal in response to the difference between the position of the actuator and the predetermined actuator position. However, the at least one main control valve is independent of the sensor and the error signal such that the hydraulic pressure controllably supplied to the actuator by the at least one main control valve in response to the control signal is independent of the error signal. Thus, the stiffness of the control surface can by enhanced by the control system even though the size and weight of the at least one main control valve and the flow requirements of the hydraulic system are significantly reduced.

8 Claims, 3 Drawing Sheets

METHOD AND APPARATUS FOR CONTROLLABLY POSITIONING A HYDRAULIC ACTUATOR

RELATED APPLICATION

This application is a continuation-in-part of U.S. patent application Ser. No. 08/179,952 filed Jan. 11, 1994, now abandoned, the contents of which are expressly incorporated in their entirety herein.

FIELD OF THE INVENTION

The present invention relates generally to methods and systems for controllably positioning a hydraulic actuator and, more particularly, to methods and systems for controllably positioning a control surface which is operatively connected to a hydraulic actuator.

BACKGROUND OF THE INVENTION

Hydraulic actuators are employed in a variety of applications to position a moveable member. For example, a variety of industrial applications, such as machine tools and robotics, include hydraulically actuated components. In addition, a variety of vehicles including submarines, helicopters and aircraft generally include a number of hydraulically actuated components. For example, modern military and commercial aircraft typically include a variety of control surfaces, such as ailerons, flaps and rudders, which are hydraulically actuated.

Consequently, a number of systems for controlling the hydraulic actuation of a moveable member have been developed. In order to increase the reliability of such hydraulically actuated control systems, a number of systems which provide redundant hydraulic actuation of a movable member have also developed. For example, control systems which employ redundant hydraulic actuation of a moveable member are described in U.S. Pat. No. 3,279,323 to C. W. Asche which issued Oct. 18, 1966; U.S. Pat. No. 3,338,139 to D. Wood which issued Aug. 29, 1967 and U.S. Pat. No. 4,436,018 to M. R. Murphy, et al. which issued Mar. 13, 1984, as described below.

The Asche '323 patent discloses a hydraulic actuator which is electrically controlled. The electrohydraulic actuator of the Asche '323 patent includes three independent signalling channels for transmitting signals, in parallel, from an input control terminal to a hydraulic motor. The three independent signaling channels each include an electrohydraulic flow control valve which controllably provides hydraulic fluid to the hydraulic motor in response to an input signal for driving a single output member. Fluid flow summing means is also in fluid circuit with the three parallel signaling channels to sum the hydraulic fluid flow provided by each of the three parallel channels to the hydraulic motor.

The electrohydraulic actuator of the Asche '323 patent also includes three transducers for generating negative feedback signals indicative of the position of the output member. According to the illustrated embodiment, each of the transducers is associated with a respective one of the independent signaling channels. A summing amplifier is also associated with each signaling channel to receive the negative feedback signal generated by the respective transducer and to add thereto the input signal. Accordingly, the fluid flow controllably provided by the hydraulic flow control valve of each of the signaling channels is adjusted in response to the position of the output member to reduce or eliminate the difference, if any, between the feedback signal indicative of the actual position of the output member and the input signal. According to the Asche '323 patent, the electrohydraulic actuator includes three parallel signaling channels and three associated transducers to provide redundancy such that the electrohydraulic actuator will continue to perform properly even if one of the signaling channels or one of the feedback loops malfunctions.

The Wood '139 patent also describes a redundant control system in which two or more servo control means are connected to each of a number of movable members. Sensor means, which generates an output signal in response to the physical position of an element within the system or a hydraulic or electric pressure within the system, are associated with each servo control means. The redundant control system of the Wood '139 patent also includes switch means, connected to each servo control means and operatively controlled by the sensor means, to deactivate a selected servo control means which has become inoperable. Due to the redundancy of the control system, however, the movable members can still be positioned by the remaining servo control means even though at least one servo control means has become inoperable.

In addition, the Murphy '018 patent describes a multiple loop control system which actuates a redundant tandem piston actuator. The redundant tandem piston actuator, in turn, provides a single composite output as evidenced by movement of a piston rod. The multiple loop control system of the Murphy '018 patent can include four identical electrical control loops which control four respective servo valves. The multiple loop control system also includes a failure management system for monitoring the electrical control loops and for disengaging control loops which fail. Due to the redundancy of the control system, the control system can perform appropriately even though one or more of the control loops may malfunction.

In a number of applications, hydraulic actuators are designed to meet two primary load requirements, namely, maximum output force and impedance or stiffness. As known to those skilled in the art, the output force F provided by a hydraulic actuator can be computed as the product of the hydraulic pressure P provided to the actuator and the hydraulic surface area A of the actuator. In other words, the output force F can be determined as:

$$F = P \cdot A$$

Thus, by increasing the hydraulic pressure supplied to the actuator, the hydraulic surface area and, consequently, the physical size and weight of the hydraulic actuator can be decreased while providing the same output force to the control surface.

In addition to the decrease in size and weight of the hydraulic actuator, a reduction in the hydraulic surface area of a hydraulic actuator correspondingly reduces the hydraulic fluid flow requirements necessary to move the actuator at the same speed. Furthermore, by decreasing the hydraulic fluid flow requirements by increasing the hydraulic pressure of the system, the relative sizes of the pumps, hydraulic lines and hydraulic actuators can all be correspondingly reduced. Therefore, the overall size and weight of the hydraulic system can be further reduced. For example, an increase in the hydraulic pressure of a hydraulic system from 3,000 psi to 8,000 psi will generally reduce the hydraulic fluid flow requirements of the hydraulic system by greater than 50%, such as 62.5% in one exemplary hydraulic system, without reducing the speed of actuation of the hydraulic actuator.

As also known to those skilled in the art, the impedance or stiffness of a hydraulic actuator is the resistance of the actuator to an uncommanded deflection due to an external force. For example, actuators which position the various control surfaces of an aircraft can be deflected by external forces to which the control surfaces are subjected, such as air flow over the control surfaces. In order to prevent the external forces from deflecting or creating undesirable oscillations of the control surface, the hydraulic actuator must be sufficiently stiff to prevent deflections by external forces up to a predetermined maximum force.

Among other factors, the stiffness of a hydraulic actuator is dependent upon the size or hydraulic surface area of the hydraulic actuator. Accordingly, by decreasing the hydraulic surface area of a hydraulic actuator in order to decrease the size and weight of the actuator system, the stiffness of the actuator also generally decreases. Thus, while it is generally desirable to decrease the size of conventional hydraulic systems, such as the hydraulic systems employed on modern aircraft, in order to decrease the weight and fluid flow requirements of the hydraulic system, the impedance or stiffness of the resulting hydraulic actuators is correspondingly decreased. Thus, the control surface positioned by the hydraulic actuator may oscillate or be undesirably deflected by external forces, such as air flow thereabout, even though the hydraulic system pressure is increased.

SUMMARY OF THE INVENTION

It is therefore an object of the present invention to provide an improved control system for positioning a hydraulic actuator.

It is another object of the present invention to provide a system for controllably positioning a hydraulic actuator which has reduced hydraulic fluid flow requirements.

It is yet another object of the present invention to provide a system for controllably positioning a hydraulic actuator which has reduced size and weight.

It is a further object of the present invention to provide an improved method for controllably positioning a control surface which is operatively connected to a hydraulic actuator.

These and other objects are provided, according to the present invention, by a method and apparatus for controllably positioning a hydraulic actuator which includes main control valve means for supplying a constant flow of hydraulic fluid and, therefore, a constant hydraulic pressure to the actuator in response to a control signal indicative of a predetermined actuator position and parallel control valve means for supplying additional hydraulic fluid flow, and, consequently, additional hydraulic pressure, to the actuator to compensate for differences between the actual position of the actuator and the predetermined actuator position. The position of the main control valve means can therefore be fixed in response to the control signal and is not readjusted in response to fluctuations in the actual position of the actuator. Instead, the parallel control valve means supplements the hydraulic pressure supplied by the main control valve means in order to urge the actuator toward the predetermined actuator position, thereby increasing the stiffness of the hydraulic actuator and minimizing errors in the actuator position without adjusting the main control valve means.

The control system of the present invention also includes hydraulic supply means for supplying hydraulic pressure to the actuator. However, the hydraulic pressure actually supplied to the actuator is regulated by both the main control valve means and the parallel control valve means as described above. The control system also includes sensor means, such as a linear variable differential transformer, for monitoring the position of the actuator, and a controller for generating an error signal in response to the difference between the actual position of the actuator and the predetermined actuator position.

Consequently, the parallel control valve means can supply additional pressure to the actuator in response to the error signal. The additional hydraulic pressure controllably supplied by the parallel control valve means corrects for differences between the actual position of the actuator and the predetermined actuator position such that the control surface is positioned as desired. Accordingly, the stiffness of the hydraulic actuator and, in turn, the control surface is enhanced. In addition, the compensation for differences between the actual position of the actuator and the predetermined actuator position provided by the parallel control valve means also increases the speed with which the actuator and, in turn, the control surface moves or responds to the control signal, thereby improving the performance of the hydraulic system of the present invention.

In one embodiment, the control surface which the hydraulic actuator positions is designed to withstand external forces up to a predetermined maximum force while maintaining a predetermined stiffness. According to one embodiment, the main control valve means includes at least one main control valve having a predetermined size. Preferably, the predetermined size of the at least one main control valve is selected to controllably provide sufficient hydraulic pressure to the actuator to position a control surface which is subjected to external forces up to the predetermined maximum force.

The size of the at least one main control valve is independent, however, of the predetermined stiffness of the control surface. Instead, the parallel control valve means includes at least one parallel control valve, positioned in a parallel relationship a respective main control valve, for controllably providing sufficient additional hydraulic pressure to the actuator to provide the control surface with the predetermined stiffness. Thus, the control surface can be controllably positioned by a main control valve which has a predetermined size dependent upon the predetermined maximum force to which the control surface will be subjected, but independent of the predetermined stiffness of the control surface. The relative size and weight of the at least one main control valve can therefore be minimized. In addition, the fluid flow requirements of the hydraulic system can be correspondingly reduced while maintaining or improving the performance of the hydraulic system.

According to one embodiment of the present invention, the hydraulic actuator is a dual tandem actuator having first and second actuating sections. According to this embodiment, the main control valve means preferably includes first and second main control valves operably connected to the first and second actuating sections of the dual tandem actuator, respectively. In addition, the parallel control valve means of this embodiment preferably includes first and second parallel control valves operably connected to the first and second actuating sections of the dual tandem actuator, respectively. According to this embodiment, the control means also preferably includes first means for summing the hydraulic pressure controllably supplied by the first main control valve and the first parallel control valve and second means for summing the hydraulic pressure controllably supplied by the second main control valve and the second parallel control valve.

Accordingly, the control system of the present invention controllably positions a hydraulic actuator and, in most instances, a control surface with a predetermined maximum output force and a predetermined stiffness such that the control surface will not be significantly deflected under normal load conditions and such that any discrepancies between the actual position of the control surface and the predetermined position can be readily corrected. In addition, the size, weight and hydraulic fluid flow requirements of the control system of the present invention are decreased relative to conventional hydraulic control systems since the hydraulic operating pressure can be increased and the size of the hydraulic actuators can be reduced while maintaining the same load requirements, namely, the predetermined output force and the predetermined stiffness.

DETAILED DESCRIPTION OF PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Figure 1:
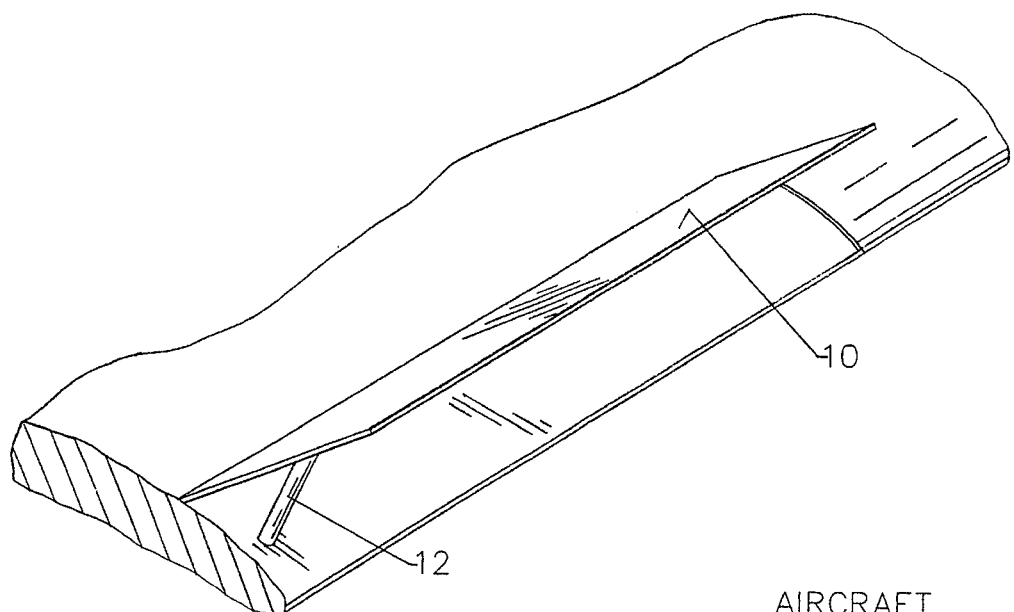
FIG. 1 is a perspective view of a hydraulically-actuated control surface positioned according to one embodiment of the method and apparatus of the present invention.

Referring now to FIG. 1, a control surface 10 which is hydraulically actuated according to the method and system of the present invention as illustrated. While the illustrated control surface is a flap of an aircraft, the control surface can be a variety of other components of an aircraft, such as aileron or a rudder. Alternatively, a control surface which is hydraulically actuated according to the method and system of the present invention can be employed in a variety of other applications, such as a control surface for a submarine, a helicopter or a variety of industrial processes, such as machine tools or robotics, without departing from the spirit and scope of the present invention.

Figure 2:
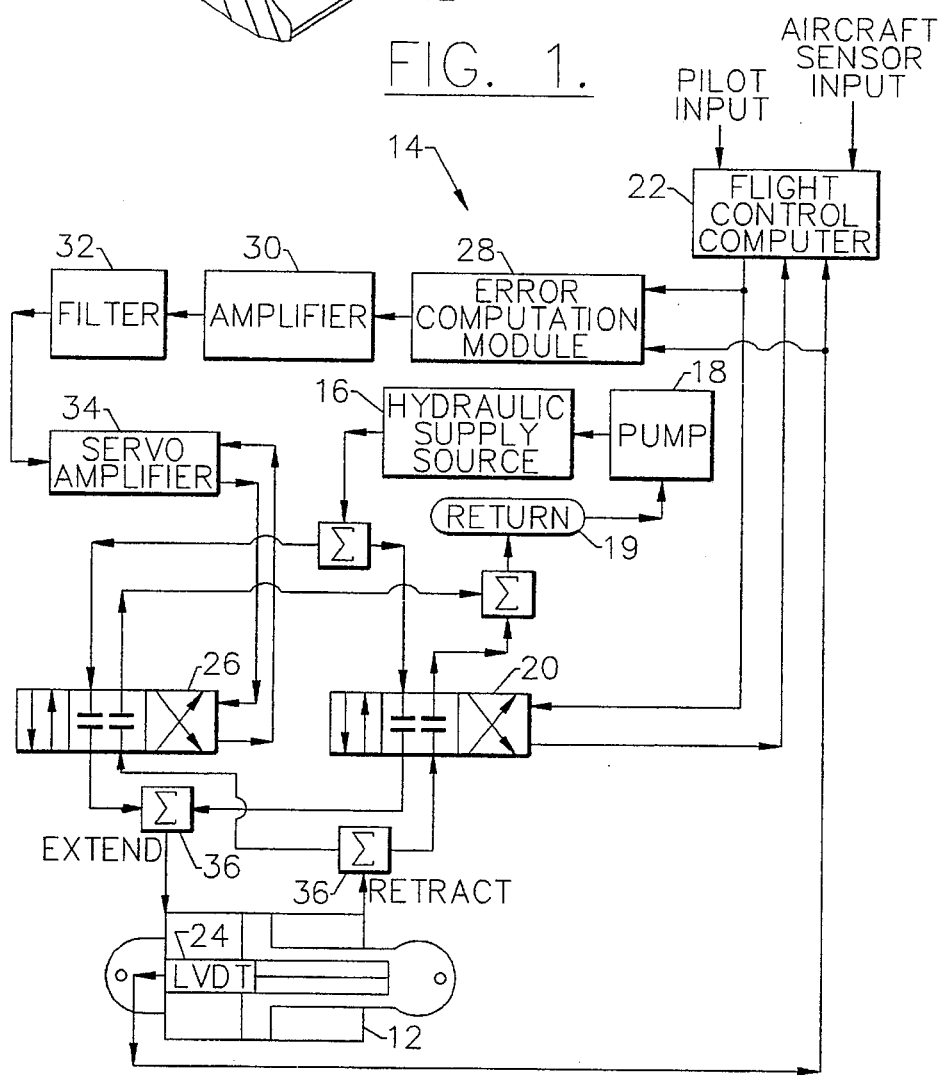
FIG. 2 is a block diagram of a system for controllably positioning a hydraulic actuator according to one embodiment of the present invention.

The control surface 10 is operably connected to a hydraulic actuator 12 which, in turn, is controllably positioned by the system and method of the present invention as illustrated schematically in FIG. 2. As shown, the control system 14 includes hydraulic supply means, such as a hydraulic fluid reservoir 16 and an associated pump 18, and a return 19 for receiving expended hydraulic fluid. The hydraulic supply means supplies hydraulic fluid and, consequently, hydraulic pressure, to the actuator. In response to the hydraulic pressure supplied by the hydraulic supply means, the actuator is positioned, thereby moving the control surface operably connected thereto, such that the position of both the actuator and the control surface can be controlled.

The control system 14 of the present invention also includes main control valve means 20, in fluid communication with the hydraulic supply means, for controlling the hydraulic pressure supplied to the actuator 12. By controlling the hydraulic pressure supplied to the actuator, the main control valve means at least partially controls the position of the actuator. More specifically, the main control valve means is responsive to a control signal indicative of a predetermined actuator position so as to control the hydraulic pressure supplied to the actuator such that the actuator is urged toward the predetermined actuator position.

Typically, the control signal is provided by a central controller or a central computer. For example, in the embodiment illustrated in FIG. 1 in which the hydraulic actuator 12 controls a flap of an aircraft, the pilot of the aircraft can select the appropriate position of the flap and, based upon signals provided by the pilot and various aircraft sensors, the flight control computer 22 of the aircraft can provide the control signal to the main control valve means 20 of the present invention for appropriately positioning the hydraulic actuator and, in turn, the control surface 10 as described above.

In one embodiment, the main control valve means 20 includes at least one main control valve and, in a preferred embodiment, a proportional hydromechanical valve having a relatively large flow rate in comparison with the parallel control valve described hereinafter. However, the main control valve means can include a variety of other types of valves without departing from the spirit and scope of the present invention.

The control system 14 of the present invention also includes sensor means 24, such as a linear variable differential transformer as illustrated in FIG. 2, for monitoring the position of the actuator 12. The control system also includes a controller, responsive to the sensor means, for determining the difference between the position of the actuator as sensed by the sensor means and the predetermined actuator position as identified by the control signal. In response to the difference determined between the position of the actuator and the predetermined actuator position, the controller generates an error signal which is preferably in-phase with the corresponding control signal.

The error signal is, in turn, provided to parallel control valve means 26 which supplies additional hydraulic fluid and, consequently, additional hydraulic pressure to the actuator 12 in response thereto. Accordingly, the parallel control valve means can correct for differences between the position of the actuator as monitored by the sensor means and the predetermined actuator position specified by the control signal. More specifically, the additional hydraulic pressure supplied by the parallel control valve means urges the hydraulic actuator and, in turn, the control surface 10 toward the predetermined actuator position specified by the control signal and increases the stiffness of the hydraulic actuator and, consequently, the control surface. For example, in the embodiment illustrated in FIG. 2, the main control valve 20 and the parallel control valve cooperate to provide hydraulic pressure to extend and retract the hydraulic actuator.

As illustrated in FIG. 2, the controller of the control system 14 can include an error computation module 28 for determining the difference between the signals provided by the sensing means 24 which are indicative of the actual position of the actuator 12 and the predetermined actuator position. Alternatively, the controller can be embedded within the flight control computer 22 such that the flight control computer computes the difference between the actual position of the actuator and the predetermined actuator position. Thereafter, the error signal generated by the controller can be amplified, such as by amplifier 30, and filtered prior to being supplied to the parallel control valve means 26.

The error signal is preferably in-phase with the corresponding control signal in order to provide the desired stiffness to the control surface 10. However, the magnitude or phase of the error signal may be controllably altered in order to damp vibrations of the control surface without departing from the spirit and scope of the present invention.

The parallel control valve means 26 generally includes at least one parallel control valve, such as a relatively high frequency hydromechanical valve having a relatively small flow rate. For example, in one embodiment, the parallel control valve has a flow rate of about 10% of the flow rate of the main control valve. In one embodiment, the filter 32 is a series of lead lag compensation filters for customizing the operation of the parallel control valve. For example, in one embodiment, the parallel control valve has a bandwidth of approximately 150 Hz. Accordingly, the lead lag compensation filters of this embodiment can suppress actuation of the parallel control valve at relatively low frequencies, such as less than 2 Hz, while amplifying the response of the parallel valve at higher frequencies, such as between 2 Hz and 150 Hz. The lead lag compensation filters of this embodiment can also suppress actuation of the parallel control valve at relatively high frequencies, such as frequencies greater than 150 Hz. However, other filters can be employed in conjunction with other types of parallel control valves in order to more particularly customize the parallel control valve without departing from the spirit and scope of the present invention.

As also illustrated in FIG. 2, a parallel valve servo amplifier 34 can be operably connected to the parallel control valve 26 so as to control the operation of the parallel control valve in response to the error signal as known to those skilled in the art. As illustrated, the parallel valve servo amplifier provides a valve command to the parallel control valve and receives valve feedback from the parallel control valve so as to stabilize the parallel valve servo amplifier.

As shown, the parallel control valve means 26 is responsive both to the controller and to the hydraulic supply means 16. In addition, the parallel control valve means includes at least one parallel control valve positioned in a parallel relationship to each respective main control valve 20 such that the outputs of a main control valve and a respective parallel control valve can be summed, such as by summing means, in order to provide a cumulative hydraulic pressure to the hydraulic actuator. For example, in one embodiment, the summing means includes a T-coupler or fitting 36 which sums the hydraulic fluid output by of the main control valve and the parallel control valve so as to provide the cumulative hydraulic fluid pressure to the hydraulic actuator 12.

According to the present invention, the main control valve means 20 is independent of the sensor means 24. In addition, the main control valve means is independent of the error signal generated by the controller. Thus, the hydraulic pressure controllably supplied to the actuator 12 by the main control valve means in response to the control signal indicative of a predetermined actuator position remains constant even though the sensor means determines that there is a difference between the actual position of the actuator and the predetermined actuator position. Instead, any difference between the actual position of the actuator and the predetermined actuator position can be corrected or compensated for by the additional hydraulic pressure supplied by the parallel control valve means 26 which urges the actuator toward the predetermined actuator position and which, consequently, increases the stiffness of the hydraulic actuator.

According to one embodiment of the present invention, the hydraulic actuator 12 of the present invention is designed to position a control surface 10 which is subjected to external forces up to a predetermined maximum force. Thus, the main control valve means 20 of this embodiment includes at least one main control valve having a predetermined size. The predetermined size of the at least one main control valve is selected to controllably provide sufficient hydraulic pressure to the actuator to position a control surface which is subjected to the predetermined maximum force.

In addition, the control surface 10 positioned by the hydraulic actuator 12 of the present invention also preferably has a predetermined stiffness. However, the size of the at least one main control valve 20 is independent of the predetermined stiffness of the control surface. Instead, the parallel control valve means 26 includes at least one parallel control valve for controllably providing sufficient additional hydraulic pressure to the actuator to provide the predetermined stiffness to the control surface which is subjected to the predetermined maximum force. Thus, the control surface can be controllably positioned by a main control valve which has a size dependent upon the predetermined maximum force to which the control surface will be subjected, but independent of the predetermined stiffness of the control surface. Accordingly, the relative size and weight of the at least one main control valve can be minimized or reduced in comparison to conventional hydraulic control systems.

In other words, once the main control valve 20 has been positioned in response to the control signal indicative of the predetermined actuator position, the position of the main control valve of the present invention does not change in response to fluctuations or oscillations in the position of the control surfaces 10, such as fluctuations caused by external forces. Instead, the parallel control valve 26 provides the additional hydraulic pressure necessary to adjust the position of the hydraulic actuator 12 and, in turn, the position of the control surface in response to fluctuations in the position of the control surface. Thus, the parallel control valve not only increases the relative sensitivity of the control system 14 to errors in actuator position, but also provides the predetermined stiffness to the control surface without increasing the size of the main control valve.

In addition to providing additional hydraulic pressure to the actuator 12 in order to correct or compensate for differences between the position of the actuator and the predetermined actuator position, the parallel control valve means 26 also supplies hydraulic pressure to the hydraulic actuator upon receipt of the control signal indicative of the predetermined actuator position. Thus, the hydraulic pressure supplied by the parallel control valve means in response to the control signal assists in the initial movement of the actuator to the predetermined actuator position. Consequently, the speed or responsiveness of the control system 14 of the present invention to the control signal, such as a control signal provided by a flight control computer 22, is also improved or increased.

Since the parallel control valve means 26 controls the stiffness of the actuator 12, the main control valve 20 need not remain unnecessarily large in order to stiffen the actuator and, in turn, the control surface 10. Thus, the size of the main control valve can be reduced. In particular, by increasing the hydraulic pressure to compensate for the reduction in size of the main control valve, the smaller main control valve can supply the same or a greater output force, such as the maximum output force in the above-described example. Consequently, by decreasing the size of the main control valve means, the hydraulic fluid flow requirements of the hydraulic system 14 and the weight of the hydraulic actuator can be significantly reduced in comparison with conventional systems, including conventional redundant actuator systems, while maintaining or improving the performance of the hydraulic system.

Figure 4:
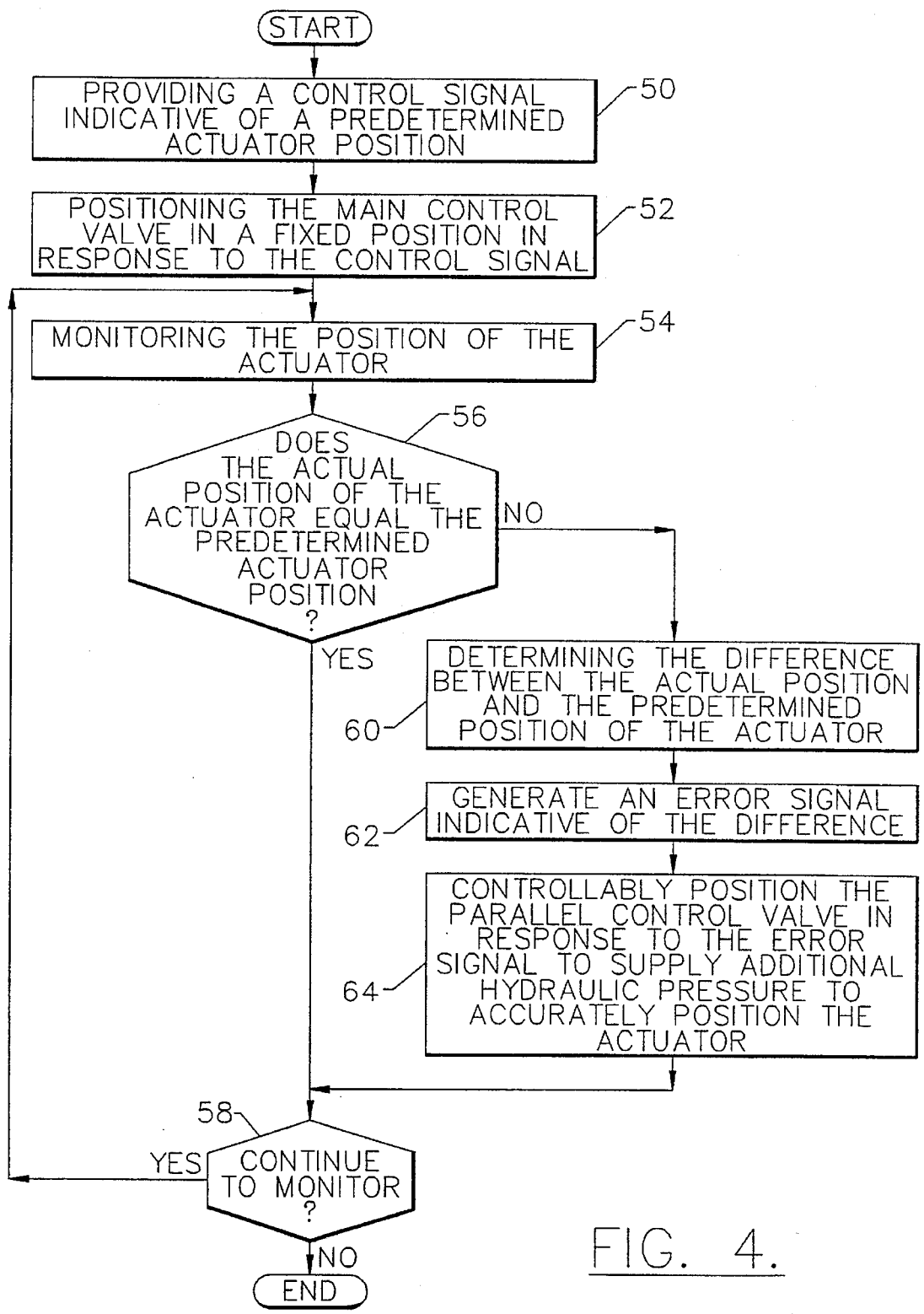
FIG. 4 is a block diagram illustrating the operations performed by the method and apparatus for controllably positioning a hydraulic actuator according to one embodiment of the present invention.

Therefore, according to the method of the present invention for controllably positioning a control surface 10 which is operatively connected to a hydraulic actuator 12, a control signal is provided, such as by a flight control computer 22, indicative of a predetermined actuator position as illustrated in block 50 of FIG. 4. Thereafter, the at least one main control valve 20 is positioned in a fixed position to create a fixed restriction to the flow of hydraulic fluid to the hydraulic actuator in response to the control signal indicative of the predetermined actuator position as shown in block 52 of FIG. 4.

The method of the present invention also includes the steps of monitoring the position of the hydraulic actuator 12, such as with the sensor means 24, and determining if the actual position of the actuator and the predetermined actuator position are equal as shown in blocks 54 and 56, respectively. If the actuator is correctly positioned, sensor means continues to monitor the position of the actuator until the monitoring operations are halted, as shown in block 58.

If, however, the actual position of the actuator 12 is different than the predetermined actuator position, the difference is determined therebetween and an error signal is generated which is indicative of the difference between the position of the hydraulic actuator and the predetermined actuator position as shown in blocks 60 and 62 of FIG. 4, respectively. In response to the error signal, additional hydraulic pressure is supplied to the hydraulic actuator by the at least one parallel control valve 26 to urge the hydraulic actuator toward the predetermined actuator position and to thereby increase the stiffness of control surface 10 without adjusting the fixed position of the main control valve 20 as shown in block 64 of FIG. 4. As described above, the sensor means 24 continues to monitor the position of the activator until monitoring operations are ceased, as shown in block 58.

Therefore, upon the selection of a predetermined actuator position, the at least one main control valve 20 is set or opened to a fixed position so as to supply a constant hydraulic pressure to the hydraulic actuator 12. Thereafter, differences between the position of the actuator and the predetermined actuator position, such as differences caused by external forces acting upon the control surface 10, are compensated for or corrected by the additional hydraulic pressure supplied by the at least one parallel control valve means 26. However, in instances in which the actuator is repositioned or the sensor means detects a relatively large difference between the predetermined and actual actuator position, the control system 14 can reposition the main control valve in addition to controllably positioning the parallel control valve as described above.

Figure 3:
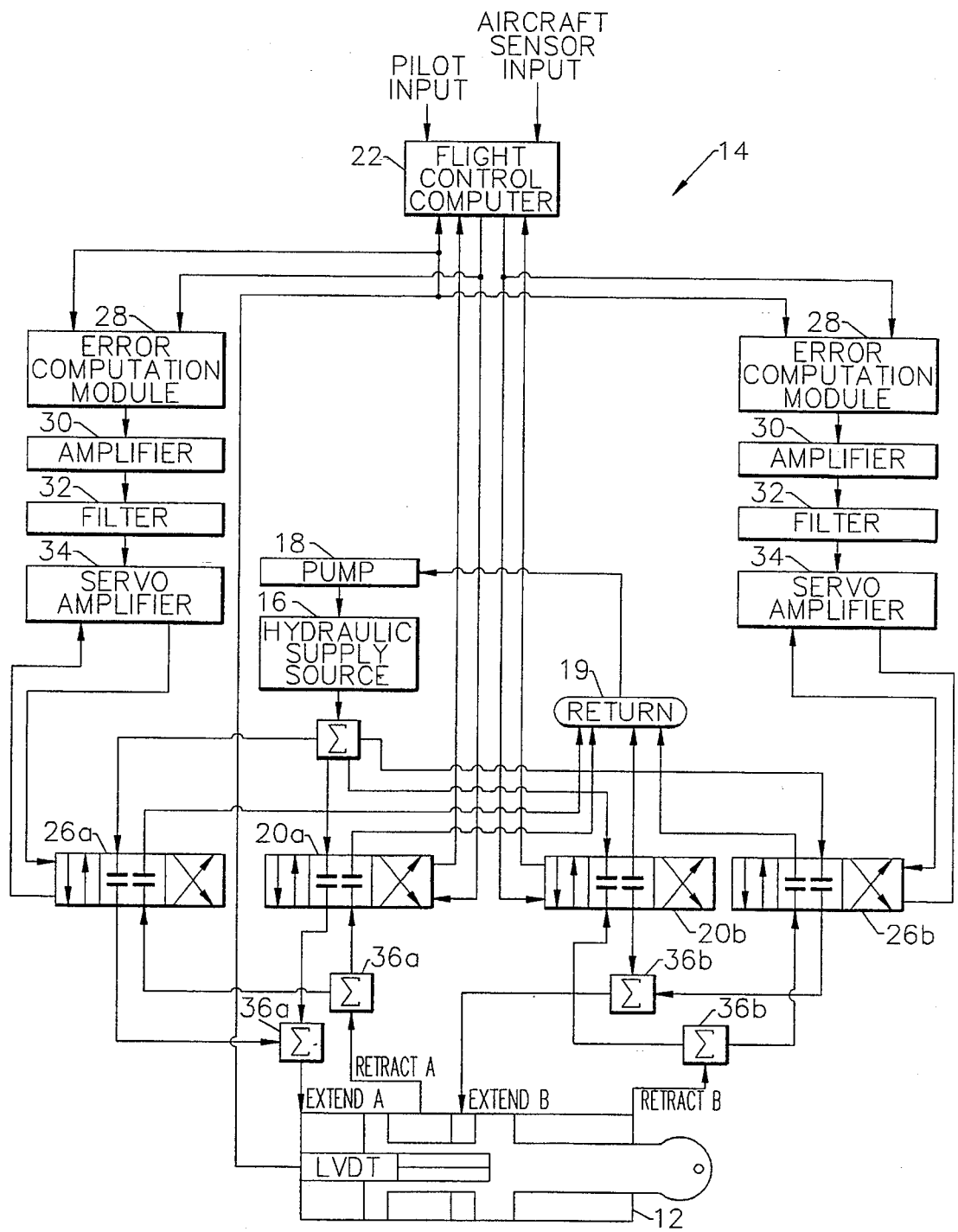
FIG. 3 is a block diagram of a system for controllably positioning a dual tandem hydraulic actuator according to another embodiment of the present invention.

According to one embodiment of the present invention, the hydraulic actuator 12 is a dual tandem actuator having first and second actuating sections as illustrated in FIG. 3. According to this embodiment, the main control valve means 20 includes first and second main control valves 20a and 20b operably connected to the first and second actuating sections of the dual tandem actuator, respectively. As also illustrated in FIG. 3, the parallel control valve means 26 of this embodiment preferably includes first and second parallel control valves 26a and 26b positioned in a parallel relationship to the first and second main control valves, respectively. The first and second parallel control valves are also operably connected to the first and second sections of the dual tandem actuator, respectively.

Accordingly, the respective positions of the first and second actuating sections can be monitored, such as by the sensor means 24, and the difference between the actual position of the first and second actuating sections and the predetermined positions of the first and second actuating sections can be determined. Thereafter, additional hydraulic pressure can be individually supplied by the first and second parallel control valves 26a and 26b to the first and second actuating sections, respectively, to compensate or correct for any differences between the actual position of the first and second actuating sections and the predetermined positions of the first and second actuating sections, respectively. For example, in the embodiment illustrated in FIG. 3, the first and second main control valves 20a and 20b and the first and second parallel control valves cooperate to provide hydraulic pressure to extend and retract the first and second actuating sections of the dual tandem hydraulic actuator 12, respectively. Accordingly, the control system and method of the present invention can effectively position the first and second actuating sections of a dual tandem actuator in a like fashion to that described above in conjunction with the actuator of FIG. 2.

As also illustrated in FIG. 3, the control system 14 of this embodiment of the present invention can also include first means 36a for summing the hydraulic pressure controllably supplied by the first main control valve 20a and the first parallel control valve 26a to the first actuating section of the dual tandem actuator 12. Likewise, the control system of this embodiment can include a second means 36b for summing the hydraulic pressure controllably supplied by a second main control valve 20b and the second parallel control valve 26b to the second actuating section of the dual tandem actuator. For example, the first and second summing means can include first and second T-fittings or couplers as described above. Accordingly, the cumulative hydraulic pressure provided by both the respective main control valve and the respective parallel control valve can be provided to the corresponding actuating section of the dual tandem actuator.

Accordingly, the control system 14 of the present invention controllably positions a hydraulic actuator 12 and, in most instances, a control surface 10 with a predetermined maximum output force and a predetermined stiffness such that the control surface will not be significantly deflected under normal load conditions and such that any discrepancies between the actual position of the control surface and the predetermined position can be readily corrected. In addition, the size, weight and hydraulic fluid flow requirements of the control system of the present invention are decreased relative to conventional hydraulic control systems since the hydraulic operating pressure can be increased and the size of the hydraulic actuators can be reduced while maintaining the same load requirements, namely, the predetermined output force and the predetermined stiffness.

In the drawings and the specification, there has been set forth preferred embodiments of the invention, and, although specific terms are employed, the terms are used in a generic and descriptive sense only and not for the purpose of limitation, the scope of the invention being set forth in the following claims.

That which is claimed is:

1. A system for controllably positioning a hydraulic actuator operatively connected to a control surface subjected to external forces up to a predetermined maximum force, the system comprising:

hydraulic supply means for supplying hydraulic pressure to the actuator to thereby position the actuator;

main control valve means, in fluid communication with said hydraulic supply means, for creating a fixed restriction to a flow of hydraulic fluid to the actuator to thereby control the position of the actuator in response to a control signal indicative of a predetermined actuator position, wherein said main control valve means comprises at least one main control valve having a predetermined size which is selected to controllably provide sufficient hydraulic pressure to the actuator to position the control surface while said control surface is subjected to said predetermined maximum force;

sensor means for monitoring the position of the actuator to generate actuator position signals indicative of the position of the actuator;

a controller, responsive to the actuator position signals generated by said sensor means, for generating an error signal in response to a difference between the position of the actuator and the predetermined actuator position; and parallel control valve means, responsive to said controller and in fluid communication with said hydraulic supply means, and positioned in a parallel relationship to said main control valve means, for supplying additional hydraulic pressure to the actuator in response to the error signal to correct for differences between the position of the actuator as monitored by said sensor means and the predetermined actuator position specified by the control signal to thereby increase the stiffness of the hydraulic actuator, wherein said parallel control valve means comprises at least one parallel control valve for controllably providing sufficient hydraulic pressure to the actuator to provide the predetermined stiffness to the control surface while said control surface is subjected to the predetermined maximum force, wherein said main control valve means is independent of said sensor means and the error signal generated by said controller such that the fixed restriction created by said main control valve means in response to a control signal indicative of a predetermined actuator position is independent of the error signal generated by said controller in response to the difference between the position of the actuator and the predetermined actuator position.

2. A system for controlling a hydraulic actuator as recited in claim 1 wherein the actuator is a dual tandem actuator having first and second actuating sections, wherein said main control valve means comprises first and second main control valves operably connected to the first and second actuating sections of the dual tandem actuator, respectively, and wherein said parallel control valve means comprises first and second parallel control valves operably connected to the first and second sections of the dual tandem actuator, respectively.

3. A system for controlling a hydraulic actuator as recited in claim 2, further comprising:

first means for summing the hydraulic pressure controllably supplied by said first main control valve and said first parallel control valve to the first actuating section of the dual tandem actuator; and second means for summing the hydraulic pressure controllably supplied by said second main control valve and said second parallel control valve to the second actuating section of the dual tandem actuator.

4. A system for controlling a hydraulic actuator as recited in claim 1 wherein the sensor means is a linear variable differential transformer.

5. A method of controllably positioning a control surface which is operatively connected to a hydraulic actuator, the method comprising the steps of:

providing a control signal indicative of a predetermined actuator position;

positioning at least one main control valve in a fixed position to create a fixed restriction to the flow of hydraulic fluid to the hydraulic actuator in response to the control signal indicative of the predetermined actuator position;

monitoring the position of the hydraulic actuator to generate actuator position signals indicative of the position of the hydraulic actuator;

providing an error signal indicative of a difference between the position of the hydraulic actuator and the predetermined actuator position; and supplying additional hydraulic pressure to the hydraulic actuator by at least one parallel control valve in response to the error signal to urge the hydraulic actuator toward the predetermined actuator position so as to thereby increase the stiffness of the control surface without adjusting the fixed position of the at least one main control valve.

6. A method according to claim 5 wherein the hydraulic actuator is a dual tandem actuator having first and second actuating sections, wherein said positioning step comprises the step of positioning first and second main control valves, operably connected to the first and second actuating sections of the dual tandem actuator, respectively, in a fixed position in response to the control signal so as to controllably supply a constant hydraulic pressure to the respective actuating sections.

7. A method according to claim 5 wherein the hydraulic actuator is a dual tandem actuator having first and second actuating sections, wherein said step of positioning at least one parallel control valve comprises the step of positioning first and second parallel control valves, operably connected to the first and second actuating sections of the dual tandem actuator, respectively, in response to the error signal to urge the respective actuating sections toward the predetermined actuator position so as to thereby increase the stiffness of the control surface.

8. A method according to claim 5 further comprising the step of summing the constant hydraulic pressure supplied by the at least one main control valve and the additional hydraulic pressure supplied by the at least one parallel control valve such that the resulting position of the control surface is based upon the cumulative hydraulic pressure supplied by the at least one main control valve and the at least one parallel control valve.

\* \* \* \* \*